Patented Dec. 9, 1952

2,621,211

UNITED STATES PATENT OFFICE 2,621,211

THIOSEMICARBAZONES

Robert Behnisch and Fritz Mietzsch, Wuppertal-Elberfeld, and Hans Schmidt, Wuppertal-Vohwinkel, Germany, assignors to Schenley Industries, Inc., New York, N. Y.

No Drawing. Application August 25, 1950, Serial No. 181,566. In Germany August 27, 1949

1 Claim. (Cl. 260—552)

The present invention relates to thiosemicarbazones and more particularly to thiosemicarbazones of a benzaldehyde having, as a substituent in the p-position an acetoacetylamino-group.

It is known that thiosemicarbazones of aromatic aldehydes display a considerable inhibitory effect on tubercle bacilli (cf. "Naturwissenschaften", 33, 315 (1946)). The compound 4-acetyl-amino-benzalthiosemicarbazone has proved to be especially useful for the treatment of human tuberculosis. Thiosemicarbazones of benzaldehyde and its substitution products can be obtained by reacting the selected aldehyde with thiosemicarbazide.

The object of the invention is to provide a novel thiosemicarbazone of a substituted benzaldehyde which is particularly effective in combating tuberculosis.

Another object resides in the provision of a process of producing this new substituted benzalthiosemicarbazone derivative.

Further objects will become apparent as the following specification proceeds.

We have found that a compound highly effective against tuberculosis is obtained by reacting the thiosemicarbazone of 4-amino-benzaldehyde with diketene to form the thiosemicarbazone of 4-aceto-acetyl-amino-benzaldehyde. It was surprising, in this reaction, that the extraordinarily reactive reagent, diketene, does not react simultaneously with the thiourea group of the thiosemicarbazone radical. It has been found that the reaction of diketene with free 4-amino-benzaldehyde and subsequent conversion of 4-acetoacetylamino-benzaldehyde so obtained into its thiosemicarbazone, could not be carried out satisfactorily because of the strong tendency of the starting material and intermediate product to polymerize. Likewise, the reaction of acetoacetic ester with the thiosemicarbazone of 4-amino-benzaldehyde is prevented by undesirable side-reactions.

The slight reactivity of diketene with the aromatic amino group in 4-amino-benzaldehyde and in 4-amino-benzalthiosemicarbazone is evidently characteristic of these products, so that of all the reactions which are theoretically possible, only the reaction of diketene with 4-amino-benzalthiosemicarbazone can be carried out practically, and even in this case, severe reaction conditions, for instance, boiling in acetone solution, are required whereas of diketene to other aromatic amines take place satisfactorily even at temperatures of about 0° C.

Example

91 Grams of thiosemicarbazide dissolved in seven liters of water and 200 cc. of 5-n-hydrochloric acid are stirred together and a solution in ether of 121 grams p-aminobenzaldehyde is slowly added. The undissolved residue is separated and the 4-amino-benzalthiosemicarbazone is precipitated by addition of sodium acetate. It is easily soluble in acetone and may be recrystallized from methanol. It consists of colorless crystals melting at 204° C.

20 Grams of p-amino-benzaldehyde-thiosemicarbazone, dissolved in 200 cc. of acetone, are reacted with 10 grams of diketene at room temperature and then refluxed for 1 to 1½ hours. The solution takes on a reddish color, which may be lightened again to a certain extent by treating with animal charcoal. Thereupon the solution is mixed with about 400 cc. of hot water until the solution begins to become turbid. On rubbing the 4-acetoacetylamino-benzalthiosemicarbazone precipitates as a pale-yellow, fine-grained deposit, melting at 190° C. with decomposition. The yield amounts to 20–22 grams.

We claim:
4-acetoacetylamino-benzalthiosemicarbazone.

ROBERT BEHNISCH.
FRITZ MIETZSCH.
HANS SCHMIDT.

REFERENCES CITED

The following references are of record in the file of this patent:

UNITED STATES PATENTS

| Number | Name | Date |
|---|---|---|
| 2,115,413 | Dahlen et al. | Apr. 26, 1938 |
| 2,152,787 | Boese | Apr. 4, 1939 |
| 2,464,597 | McQueen | Mar. 15, 1949 |

OTHER REFERENCES

Behnisch et al., "Naturwissenschaften," vol. 33, Nov. 30, 1946, p. 315.
Domagk, "Zentralblatt fur Gynakologie," vol. 69, page 837 (1947).